US005411716A

United States Patent [19]

Thomas et al.

[11] Patent Number: 5,411,716

[45] Date of Patent: May 2, 1995

[54] SOLID DETERGENT DISPENSER FOR FLOOR SCRUBBER MACHINE

[75] Inventors: John E. Thomas, River Falls, Wis.; Daniel K. Boche, Eagan, Minn.; James D. Decker, Apple Valley, Minn.; James L. Copeland, Burnsville, Minn.

[73] Assignee: Ecolab Inc., St. Paul, Minn.

[21] Appl. No.: 169,325

[22] Filed: Dec. 17, 1993

Related U.S. Application Data

[63] Continuation-in-part of Ser. No. 131,653, Oct. 5, 1993.

[51] Int. Cl.[6] .......................... B01D 11/02; B08B 7/00

[52] U.S. Cl. .......................................... 422/264; 134/7

[58] Field of Search .................... 422/263, 264, 264 B; 222/189; 137/268; 239/222.11, 310; 134/7, 172, 198; 15/320

[56] References Cited

U.S. PATENT DOCUMENTS

| | | | |
|---|---|---|---|
| 3,870,471 | 3/1975 | Tepas, Jr. et al. | 422/264 B X |
| 3,939,527 | 2/1976 | Jones | 15/353 |
| 3,974,541 | 8/1976 | Silvis et al. | 15/320 |
| 4,295,244 | 10/1981 | Herpers et al. | 15/320 |
| 4,348,783 | 9/1982 | Swanson et al. | 15/320 |
| 4,377,017 | 3/1983 | Herpers et al. | 15/320 |
| 4,393,538 | 7/1983 | Olson | 15/320 |
| 4,462,511 | 7/1984 | Fulmer et al. | 222/52 |
| 4,464,810 | 8/1984 | Karpanty | 15/320 |
| 4,566,149 | 1/1986 | Fitzwater | 15/320 |
| 4,586,208 | 5/1986 | Trevarthen | 8/158 |
| 4,667,364 | 5/1987 | Meili | 15/320 |
| 4,675,935 | 6/1987 | Kasper et al. | 15/319 |
| 4,687,121 | 8/1987 | Copeland | 222/64 |
| 4,690,305 | 9/1987 | Copeland | 222/52 |
| 4,709,442 | 12/1987 | Sletten, II | 15/320 |
| 4,759,094 | 7/1988 | Palmer et al. | 15/320 |
| 4,803,753 | 2/1989 | Palmer | 45/320 |
| 4,826,661 | 5/1989 | Copeland et al. | 422/106 |
| 4,858,449 | 8/1989 | Lehn | 68/12 R |
| 4,861,518 | 8/1989 | Morganson et al. | 252/548 |
| 4,893,375 | 1/1990 | Girman et al. | 15/321 |
| 4,956,891 | 9/1990 | Wulff | 15/320 |
| 5,088,149 | 2/1992 | Berg et al. | 15/322 |

OTHER PUBLICATIONS

Wrangler Brochure, entitled "Wrangler F/B 27"–33" Automatic Scrubbers," published by The National Super Service Company, copyright 1992.

Tornado Brochure, entitled "Tornado Long-Range Automatic Floorkeepers," published by Brever Electric Mfg. Co., copyright 1992.

*Primary Examiner*—Robert J. Warden
*Assistant Examiner*—E. Leigh Dawson
*Attorney, Agent, or Firm*—Merchant, Gould, Smith, Edell, Welter & Schmidt

[57] ABSTRACT

Disclosed is a dispenser (10) for use with an automatic floor scrubbing machine (75), and a method for cleaning a floor. The dispenser (10) has a solid chemical (13) which is dissolved by water spray from a spray nozzle (21). The detergent solution is then directed by a conduit (25) to a scrub brush (85). A water reservoir (83) provides water for the detergent solution, and a valve (38) directs water to a rinse conduit (37) for rinsing of the floor. After cleaning, the dirty water or detergent solution is carried through conduit (36) to a recovery tank (84).

24 Claims, 5 Drawing Sheets

SOLID DETERGENT DISPENSER FOR FLOOR SCRUBBER MACHINE

This is a continuation-in-part of application Ser. No. 08/131,653, filed Oct. 5, 1993.

FIELD OF THE INVENTION

This invention relates generally to floor cleaning machines and more particularly to a solid detergent dispenser for floor cleaning machines, in which the solid detergent is dissolved in water to form a cleaning solution.

BACKGROUND OF THE INVENTION

Automatic floor cleaning machines are designed to clean hard floor surfaces. Typically, the automatic floor cleaner applies detergent solution to an area of the floor, scrubs the floor with the detergent solution, and vacuums the dirty or spent wash water off the floor area. The floor cleaning machine has a compartment for the clean detergent solution, and a compartment for the dirty detergent solution. During use, the detergent solution is progressively transferred from the clean solution compartment to the dirty or spent solution compartment.

The operator makes the detergent solution by adding a certain amount of concentrated liquid detergent to a certain quantity of clean water. The concentration of the resulting detergent solution may be rather imprecise, in that it depends merely upon the ratio of concentrate detergent solution to water. If too little detergent solution is added, then there may be inadequate cleaning of the floor. If too much detergent solution is added, then an undesirable residue, excessive foaming, and waste of the detergent may result.

With conventional floor scrubbers, the concentration of the detergent solution is fixed once the solution has been made. However, the optimum detergent concentration will vary according to the type and amount of soil on the floor, the type of floor cleaning machine, the type of cleaning chemical being dispensed, the type of surface being cleaned, the temperature of the solvent, the degree of mechanical action applied to the floor being cleaned, and the volume of cleaning solution being produced. With known designs, the only variables available to the operator in adjusting the cleaning efficiency of the unit are: (1) the dispensing rate of the detergent solution, (2) the linear velocity of the machine, and 3) the ability to make repetitive passes over the floor area. The former variable is the rate of the detergent solution flowing onto the scrubbing brush. As a result, the operator's ability to control the detergent action of the machine is somewhat limited.

With conventional floor cleaners, it is also relatively difficult for the operator to rinse the floor with clear water, because there is no capability for clear water to be conveniently dispensed from the floor scrubber. In order to rinse the floor, the user must assemble a separate hose assembly from a nearby water supply point. This is an inconvenient and time-consuming process, especially if the water source is remote from the floor area that is being rinsed. It is possible to dispense water through the floor scrubber if the detergent solution from the solution tank is completely drained and the tank is then filled with fresh water. However, the solution tank contains detergent residue, and this process would be time-consuming and difficult.

The present invention addresses these and many other problems associated with currently available floor cleaning systems.

SUMMARY OF THE INVENTION

The invention is a dispenser for an automatic floor scrubbing machine which utilizes a solid cleaning composition. One aspect of the present invention is a floor scrubber comprising a water tank, a rinse conduit for directing water to a brush means, a dispenser containing a solid detergent, a cleaning solution conduit for directing the cleaning solution toward the brush means, and adjustment means for varying the concentration of the cleaning solution. In the preferred embodiment, the adjustment means comprises raising and lowering the solid detergent with respect to a spray nozzle. Another aspect of the present invention is a dispenser for a floor cleaning machine, comprising housing means for a solid chemical, a spray nozzle for directing a solvent upon the chemical's eroding surface, a solvent inlet line for directing solvent to the spray nozzle, and a solution outlet conduit for directing the detergent solution to the floor which is to be cleaned. Yet another aspect of the present invention is a method for cleaning a floor, comprising the steps of: providing a solid detergent dispenser which is mounted upon a portable floor cleaning machine, spraying water upon an eroding face of the solid detergent to form a detergent solution, and dispensing the detergent solution proximate the floor cleaning machine's scrubbing brushes.

An advantage of the present invention is the ability to instantaneously change the concentration of detergent in the floor cleaning solution. This feature allows the operator to dispense more detergent on heavily soiled areas, and allows the operator to conserve detergent in areas which are relatively clean. The dispenser has several concentration settings which allow for adjustment of the detergent concentration according to the particular cleaning requirements. The distance between the solid detergent and the water spray nozzle is adjustable by the operator, which results in a variable cleaning solution concentration, In the preferred embodiment, adjustment of the detergent concentration is accomplished in a simple manner which requires no complex electronics. Alternatively, the concentration could be controlled by suitable electronic means, such as an electrical and mechanical arrangement utilizing a manual control knob and a cable, or a more complex feedback mechanism, such as a servo system, for fully automatic control.

Another advantage of the present invention is the ability to change instantaneously from the dispensing of a detergent solution to the dispensing of a rinse solution. This feature provides the user with greater flexibility and convenience in cleaning floors.

Yet another advantage of the present invention is the ability to utilize a detergent product which is in solid form, rather than liquid. The solid form of the detergent product facilitates transportation of the detergent, makes the detergent easy to use and handle, and has predictable dissolving characteristics. The solid form of the cleaning chemical is advantageous for safety reasons, because it minimizes the operator's contact with the cleaning chemical. A solid product also allows for the combination of non-compatible ingredients, such as a silicon defoamer and a surfactant in a solid detergent matrix.

Because the silicon defoamer can be added to a solid product more effectively than it may be added to a liquid product, the solid dispenser of the present invention allows for reduced foaming of the cleaning product when it is applied to the floor. This feature allows for easier pick-up of the dirty cleaning solution. It is important to control the foam properties of the cleaning solution, so that the vacuum pick-up system can work properly. The liquid detergent utilized with conventional floor scrubbing systems does not permit the use of high-foaming detergent additives.

The dispenser is relatively inexpensive, and requires minimal, if any, maintenance. It is also relatively simple to retrofit conventional floor scrubbing machines with the dispenser of the present invention.

As used herein, the terms "cleaning chemical" and "detergent" refer to those compounds or mixtures commonly added to aqueous liquids to aid in the cleaning and rinsing of hard surfaces. Such chemicals include detergents, buffers, bleaches, rinse aids, etc.

For a better understanding of the invention, and of the advantages obtained by its use, reference should be made to the drawings and accompanying descriptive matter, in which there is illustrated and described a preferred embodiment of the invention.

DESCRIPTION OF THE PREFERRED EMBODIMENT

Figure 1:
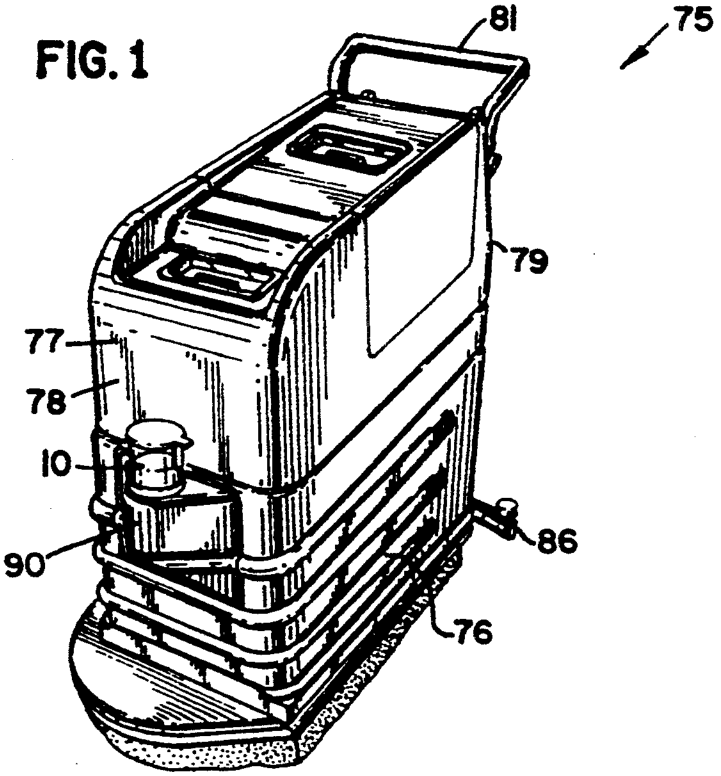
FIG. 1 is a perspective view of a floor scrubber utilizing the dispenser of the present invention.
Figure 2:
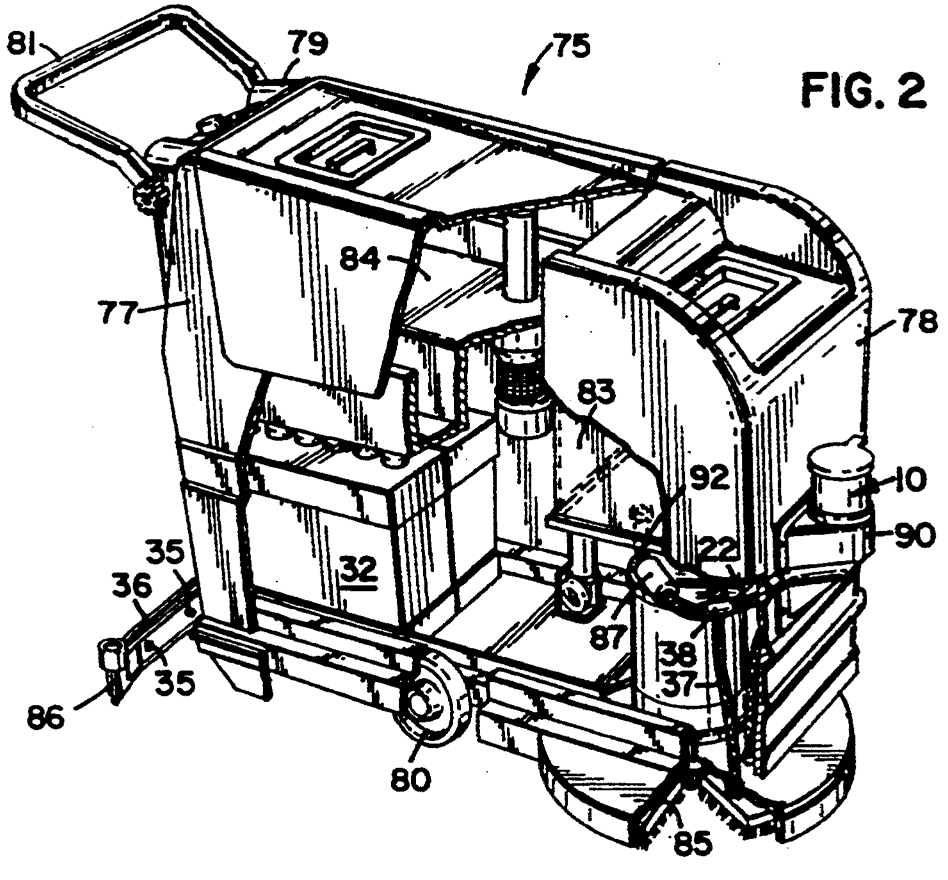
FIG. 2 is a partial breakaway, perspective view of a floor scrubber utilizing a dispenser of the present invention.

Referring to the Drawings, the floor cleaning machine 75 includes a support structure 76 having metal framework components, and a housing 77 which is made of a molded polymeric material. The machine 75 has a front end 78 and a rear end 79. Beneath the support structure is wheel means 80. At the rear of the machine 75 is a handle 81 for manually grasping and pushing the cleaning machine 75. The floor cleaning machine may be either a walk-behind style as illustrated in FIGS. 1–2, or a ride-on style.

The operator is able to control the linear velocity of the floor scrubber 75. With some types of floor scrubbers, the operator has a choice of three or four linear velocities, although with some floor scrubbers, the linear velocity is continuously variable.

Within the housing 77 are two tanks: a solution tank 83 proximate the front end 78 of the machine 75, and a recovery tank 84 proximate the rear end 79 of the machine 75. The detergent solution tank 83 may vary in size from 5 to 50 gallons. The recovery chamber 84 collects the dirty or spent cleaning solution which is vacuumed from the floor. The recovery tank 84 has a drain hose (not shown) for emptying the dirty solution where desired.

Near the front 78 of the machine 75 are one or more rotating scrubbing brushes 85, which may be of many different sizes and configurations. The power-operated scrub brush 85 is operated by a drive belt (not shown) or the equivalent. The detergent solution is most commonly gravity fed onto the scrubbing brushes 85.

The flow of detergent solution is facilitated by a manually operated valve which is controlled by the operator of the machine 75. The valve has an on/off function, and the detergent solution flow rate can be controlled by partially opening the valve. Alternatively, a pump may be employed to transfer the detergent solution onto the scrubbing brushes 85, with the pump being controlled by the operator.

Near the rear of the machine 75, i.e., behind the scrub brush 85, is a plurality of vacuum pickup inlet nozzles 35 which pick up the spent detergent solution from the floor. The spent solution is drawn into a conduit 36 and into the dirty solution tank 84. The vacuum pick-up nozzles are attached to a rubber pick-up blade 86 which directs the detergent solution to the vacuum conduit 36.

The dispenser of the present invention and its associated components will now be described. The dispenser 10 is preferably mounted to the front wall of the floor scrubber 75, as illustrated in FIGS. 1 and 2. However, it is to be understood that the dispenser 10 could be mounted within the interior of the floor scrubber machine 75 or in any other suitable location. In the preferred embodiment, a molded plastic shroud 90 surrounds and encloses the bottom portion of the dispenser 10. The upper portion of the dispenser 10 is not covered by the shroud, and it is accessible to the operator for adding detergent and adjusting the detergent concentration, as will be described below. The dispenser 10 is mounted to the shroud 90 with suitable fasteners, such as screws, and the shroud 90 is mounted to the front wall of the machine 75 with suitable fasteners, such as screws.

With conventional floor scrubbing machines as described in the Background above, a detergent solution would be contained within the detergent solution tank 83. With the present invention, the floor scrubber's detergent solution tank 83 becomes a water reservoir 83. Alternatively, the tank 83 may be filled with a chemical additive which acts as a solvent and reacts favorably with the solid detergent.

Figure 3:
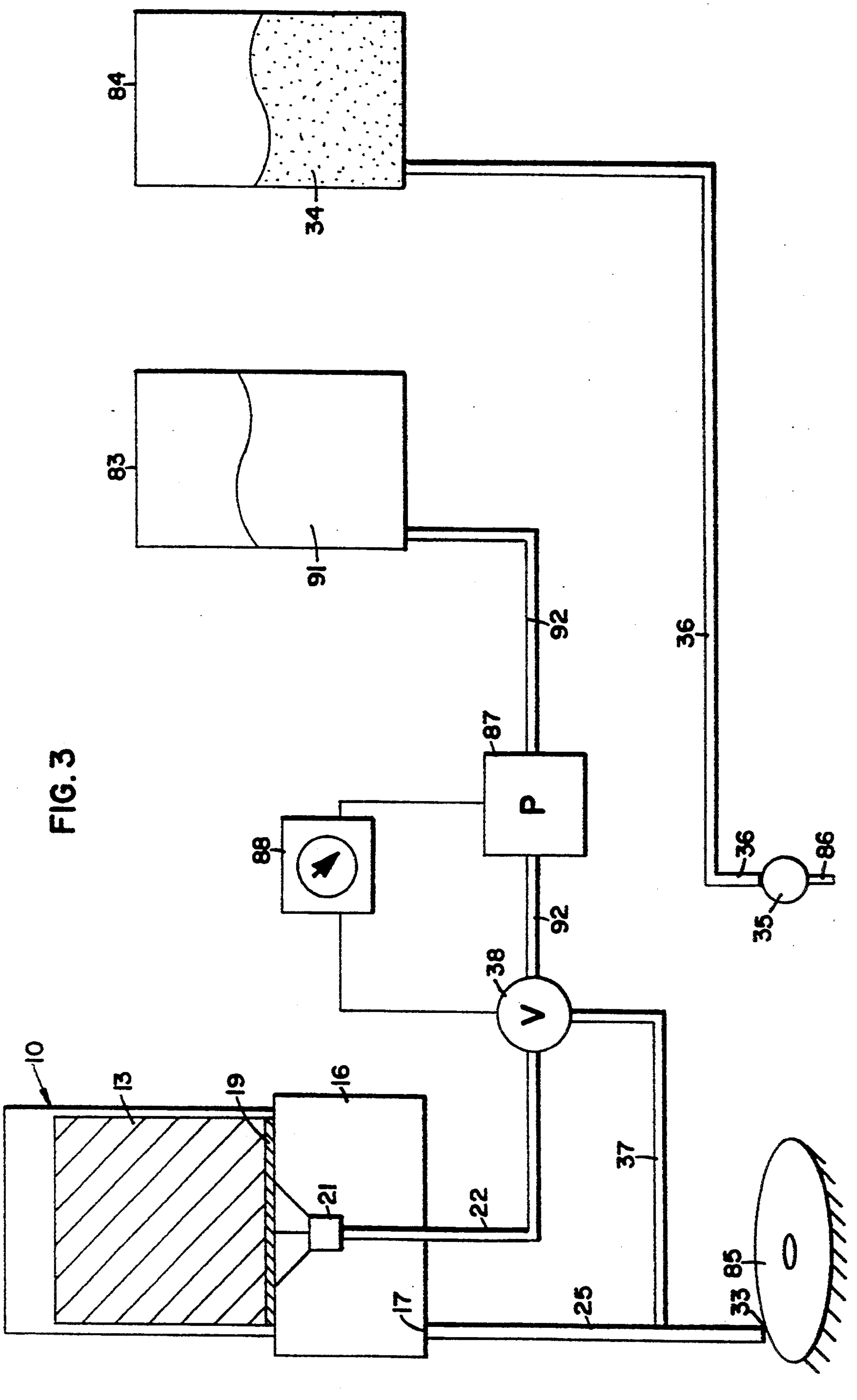
FIG. 3 is a schematic diagram illustrating the flow lines of the floor scrubber and dispenser of the present invention.

Referring to FIG. 3, the flow lines for the floor scrubber 75 and dispenser 10 are illustrated. The water 91 is held within the water tank 83, and there is a water conduit 92 in fluid communication with the water tank 83. The conduit 92 terminates in a diverter valve 38, which is controlled by the operator. The solenoid diverter valve 38 has one inlet line 92 and two outlet lines: an outlet line 22 which extends to the detergent dispenser 10, and an outlet line 37 which directs water to the scrub brush 85. In the preferred embodiment, the conduits 92, 22, 25, 37 and 36 are made of plastic tubing. Alternatively, if no diverter valve 38 is used, then there could be two solenoid valves (not shown), one valve being in the rinse conduit 37 and the other valve being in the dispenser inlet line 22.

The valve 38 normally blocks water flow to the nozzle 21 and is operative to its open position only upon receipt of an external control signal. Upon receipt of such a control signal, the valve 38 opens and water flow is allowed to flow through water line 22 or 37. The operator may choose whether to direct the water through a solid detergent dispenser 10 or to bypass the detergent and direct the water proximate the scrubbing brush 85. That is, the operator has the ability to instantaneously change from applying a detergent solution to a plain water rinse.

Solution flow from the water reservoir 83 is facilitated by a pump 87. In the preferred embodiment, the pump 87 is a diaphragm pump controlled by a variable control 88 which the operator may adjust. The variable output pump 87 controls the rate of water flow and therefore the amount of water 91 or detergent solution dispensed by the floor scrubbing machine 75. The variable output pump 87 allows for continuous variation of the solution flow up to the pump's maximum output. The pump 87 also provides a constant flow rate which is independent of the capacity of the tank 83 or the solution head in the tank 83. In the preferred embodiment, the water pump 87 is powered by the floor scrubber's battery 32.

The rate of water flow from the tank 83 may vary according to the linear velocity of the floor scrubber machine 75. That is, a higher velocity increases the dispensing rate, so that there is a uniform distribution of detergent solution on the floor. In the preferred embodiment, suitable electronics in the cleaning machine 75 sense the machine's speed and then automatically adjust the rate of water flow through the variable output pump 87.

The dispenser 10 of the present invention is suitable for retrofitting onto existing, conventional floor scrubbing machines 75. To do so, two holes are cut in the front wall of the cabinet 77, one hole to accommodate the dispenser inlet line 22 and the other hole to accommodate the outlet tube 25. The dispenser 10 is mounted within the shroud 90, and the shroud 90 is fastened to the front wall of the dispenser 75. The valve 38, pump 87, and controller 88 are installed within the interior of the floor scrubber 75, along with their associated conduits 22, 25, 37.

There may be two outlet lines which extend to the scrub brush 85, one for the fresh water conduit 37 and the other for the detergent solution 25, as illustrated in FIG. 2. Alternatively, the fresh water conduit 37 may tie into the dispenser outlet 25, thereby resulting in a single outlet nozzle 33, as illustrated in FIG. 3.

FIGS. 4–8 illustrate the dispenser 10 of the present invention in greater detail. The dispenser 10 has housing means 11. The housing 11 includes an upper storage portion for retainably holding a mass of solid block chemical 13. In the preferred embodiment, the solid chemical 13 is a neutral floor cleaner, such as a type sold by Ecolab Inc. of St. Paul, Minn. The housing 11 of the dispenser 10 is preferably cylindrical in shape and made of a suitable plastic material. The housing's bottom surface 53 has an outlet port 17 in fluid communication with the outlet line 25, and an inlet port in fluid communication with the water inlet line 22.

The housing 11 has a lower collector portion 16. The collector portion 16 may have a horizontal bottom wall, or it may be configured in a funnel shape that converges downwardly to an outlet port.

Positioned above the housing 11 is the product container 20, which is preferably substantially cylindrical in shape and has an outer diameter slightly smaller than the inner diameter of the housing 11. The container 20 has a substantially flat upper surface 69. Contained within the product container 20 is the solid product 13, such as detergent. In the preferred embodiment, the detergent 13 is cast, shipped and stored in the container 20. The container 20 has one exposed surface and a removable cap or lid (not shown) which encloses the exposed surface before use. At the point of use, the cap or lid is removed, and the container 20 is inverted over the dispenser 10 so that the chemical 13 is positioned within the dispenser 10. Thus, the container 20 also acts as a cover for the dispenser 10.

Figure 7:
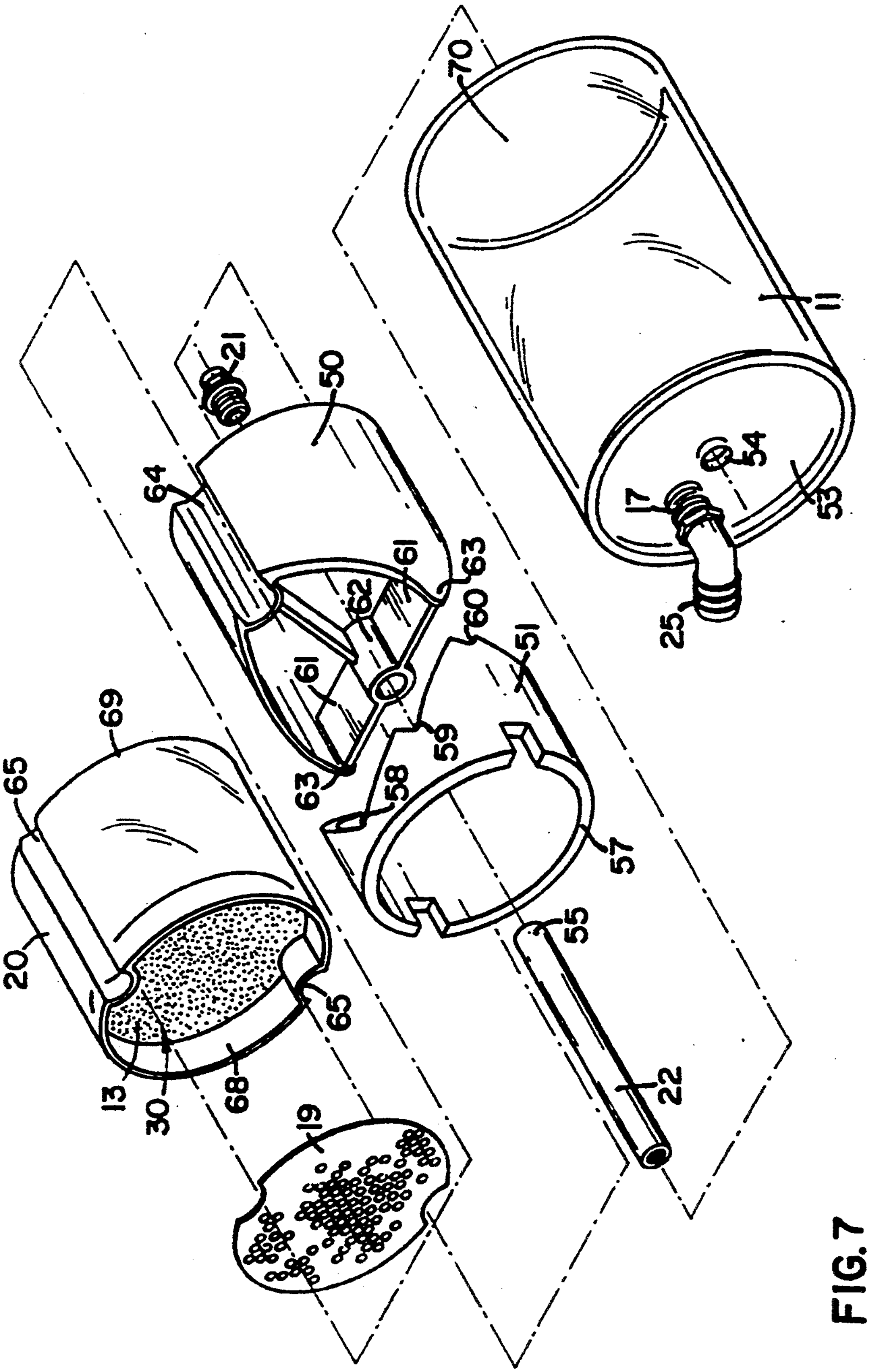
FIG. 7 is a perspective, exploded view of the dispenser.
Figure 8:
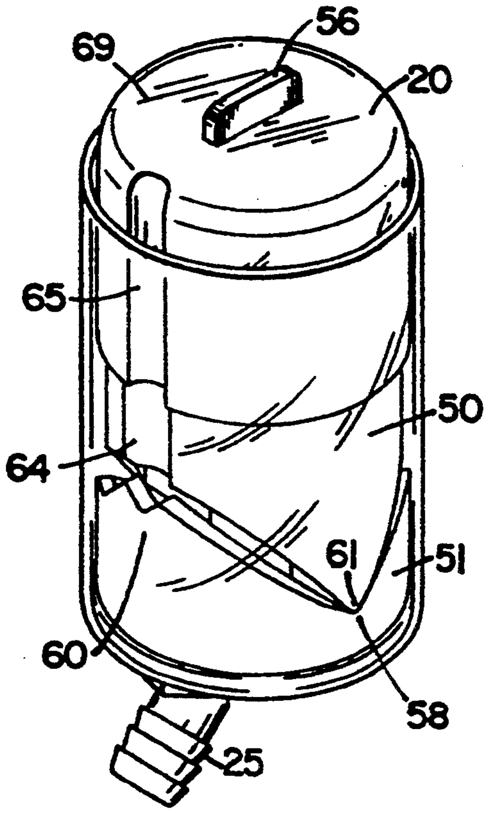
FIG. 8 is a perspective view of the dispenser.

The solid block of chemical 13 is supported by a horizontal screen 19, which is shown in FIG. 7. The screen 19 defines a dissolving or eroding surface 30 of the solid detergent. The support screen which is mounted to the inner walls of the housing 11. The support screen mesh size supports the solid block of wash chemical 13 without significantly impeding access of a water spray onto the lower face 30 of the wash chemical 13 (typically about 5/32 inch (0.4 cm) openings). The cross-sectional area of the wash chemical block 13 is about the same size as the cross-sectional area of the housing 11 to allow the block 13 to rest flatly upon the support screen 19 and to prevent water spray from passing along dispenser housing's inner wall. The walls 69 of the container 20 slidably fit within the walls of the housing 11.

The dispenser 10 as disclosed herein is in a vertical configuration, in which the solid chemical 13 is positioned above the spray nozzle 21. It is to be understood that a different configuration could be utilized, for example, in which the spray nozzle 21 directs a horizontal spray onto the vertical eroding surface 30, and the eroding surface 30 is maintained against a vertical support screen 19 by means of suitable biasing means behind the solid chemical 13.

Spray forming means are mounted in the housing 11. The spray forming nozzle 21 is connected to the pressurized water (or other solvent) 91 by means of the water supply lines 92 and 22. Preferably, the spray nozzle 21 is screwed onto the end 55 of the water inlet line 22. The water inlet line 22 extends through an aperture 54 in the housing 11. The water 91 is dispersed by the spray forming means 21 into engagement with substantially the entire lower surface 30 of the chemical block 13. Spray from the nozzle 21 is of relatively low pressure (typically 10 to 25 p.s.i.) and wets only the lower portion 30 of the solid block chemical 13. The dissolved chemical passes in solution through the support screen 19, is directed by the collector portion 16 of the housing 11 to the outlet port 17, and passes through a chemical solution conduit 25 to the scrubbing brush 85.

Optionally, a $\frac{1}{4}$ to 1/20 inch (0.64–0.13 cm) lower screen (not shown) is located in the collector portion 16 of the housing 11 proximate the outlet port 17 to catch any undissolved chunks of chemical which have broken away from the main block 13 and which are small enough to pass through the support screen 19. This prevents small chunks of chemical from collecting in the outlet port 17 or the conduit 25 and blocking the flow of concentrated chemical solution out of the dispenser 10.

An electrically or mechanically actuated safety control switching circuit can be connected to sense the operative position of the container 20 in order to prevent water spray from the nozzle 21 whenever the container 20 is not in position, or whenever there is no solid chemical in the dispenser 10. This prevents a spray of water or solvent 91 while the operator is loading the dispenser. A safety control switch (not shown) may be mounted upon the dispenser 10.

The product container 20 has a pair of oppositely disposed, longitudinal keyed portions 65, which extend vertically the entire height of the product container 20. The chemical product 13 has corresponding longitudinal keyed portions.

The concentration of the detergent in the resulting detergent solution is controlled by water temperature, eroding screen type, spray pressure, detergent type, and the distance between the spray nozzle and the eroding surface. The spray pressure is controlled by the type of nozzle utilized and the setting of the pump 87. The temperature of the water 91 which is used with floor scrubbers 75 is generally cold, between 40° and 70° F.

Figure 6:
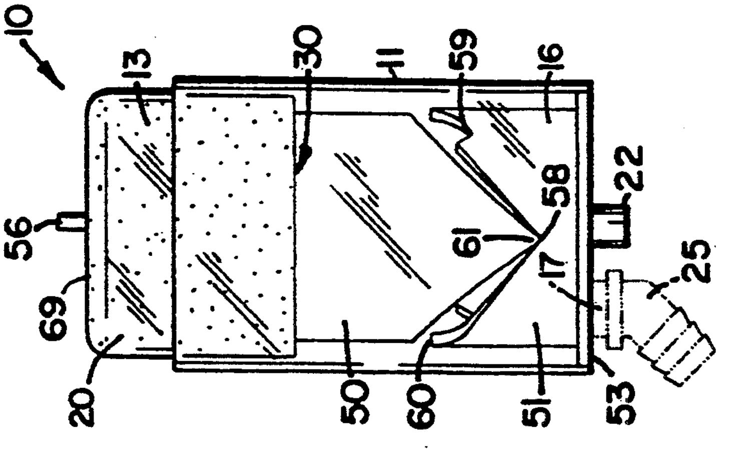
FIG. 6 is a side elevational view of the dispenser in its low concentration position.
Figure 5:
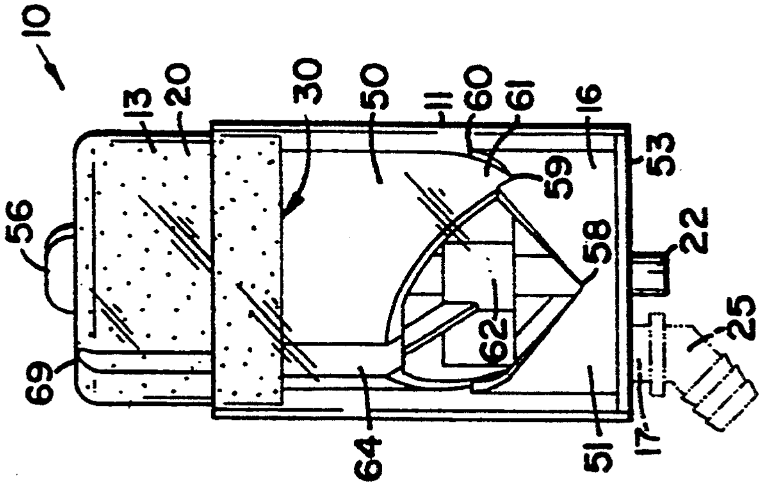
FIG. 5 is a side elevational view of the dispenser in its medium concentration position.

In the preferred embodiment, the solid wash chemical's position is vertically movable with respect to a fixed spray nozzle 21. Thus, the position of the spray nozzle in FIGS. 5 and 6 is the same as the position shown in FIG. 4, even though the spray nozzle is hidden from view in FIGS. 5 and 6.

A preferred mechanism for adjusting the vertical position of the solid chemical is illustrated in FIGS. 4–8. The preferred adjustment means comprises a pair of cooperating cam support members 50, 51. The support members 50, 51 allow for adjustment of the solid chemical 13 at three levels: the highest level illustrated in FIG. 4, the middle level illustrated in FIG. 5, and the lowest level illustrated in FIG. 6. In the preferred embodiment, the cam members 50, 51 are each constructed as separate members which have been molded from a suitable plastic material.

The lower cam member 51 is annular, and has a flat, bottom surface 57 which is interconnected to the bottom wall 53 of the housing 11 by adhesive or other suitable means. The upper surface of the cam member 51 has a jagged profile by virtue of a plurality of notches. The profile of the cam member 51 is symmetrical, with each half of the cam member 51 having a low notch 58, a medium notch 59, and a high notch 60.

In the preferred embodiment, the upper cam member 50 is also annular and has the same diameter as the lower cam member 51. A central sleeve 62 is located within the interior of the cam member 50, with a plurality of radial flanges 61 extending from a central sleeve 62. The sleeve's aperture receives the water inlet line 22. The upper cam member 50 is also symmetrical, having a pair of downwardly extending points 63 which are oppositely disposed. The points 63 are sized and configured to fit within the notches 58, 59, 60 of the lower cam member 51.

The cam member 50 has a pair of oppositely disposed grooves 64. The grooves 64 are sized and configured to be slightly larger than the keyed portions 65 in the product container 20. Because of the nesting of the cam grooves 64 with the container keyed portions 65, rotation of the product container 20 results in corresponding rotation of the solid chemical 13, and the product container 20 constitutes a "control knob" for adjustment of the solid chemical's position. The product container 20 may be provided with ridges (not shown) on its exterior surface to facilitate .its rotation. The upper portion of the product container 20 preferably has handle means 56 to facilitate adjustment of the product container's position. The keyed portions 65 are shown as semi-circular in cross-section, but could be of any desired shape. Furthermore, more than two keyed portions could be provided.

Figure 4:
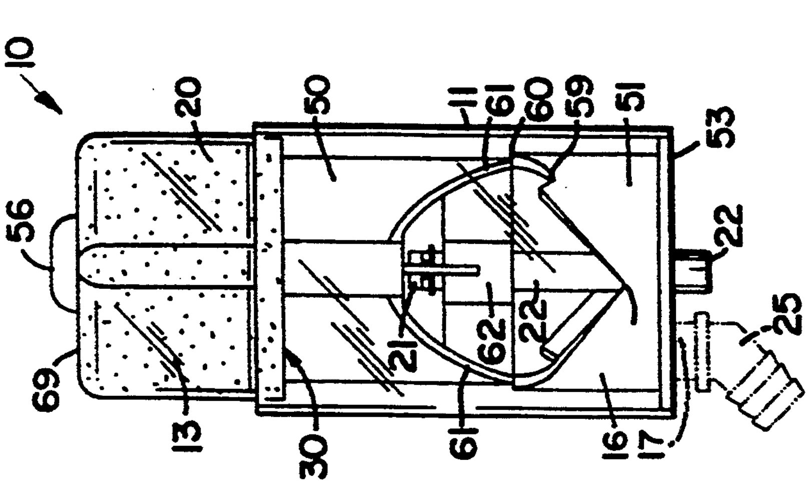
FIG. 4 is a side elevational view of the dispenser of the present invention in its high concentration position.

As illustrated in FIG. 4, the product 13 is at its highest level when the points 61 are positioned within the high notches 60. As shown in FIG. 5, the solid product 13 and eroding surface 30 are in a middle position when the points 61 are positioned within the medium notches 59. Similarly, the low position, illustrated in FIGS. 6 and 8, occurs when the points 61 are positioned within the low notches 58. Because the spray nozzle's position is fixed, the low position illustrated in FIGS. 6 and 8 means that the nozzle-to-eroding surface distance is minimized, whereas the high position illustrated in FIG. 4 means that the nozzle-to-eroding surface distance is maximized. Therefore, the high position of the solid product 13 in FIG. 4 corresponds to a relatively low detergent concentration, the intermediate position of the solid chemical 13 in FIG. 5 corresponds to a medium concentration level, and the low position of the solid chemical 13 illustrated in FIGS. 6 and 8 corresponds to a relatively high concentration of the detergent solution. The dispenser 10 preferably has concentration indication means (not shown), such as labels which indicate the concentration levels, e.g., "High," "Medium" and "Low".

An alternative adjustment means to the above-described cam mechanism is a threaded arrangement which allows the height of the solid chemical 13 to be continuously adjustable, rather than having only three settings. In another embodiment of the invention, the spray nozzle 21 is mounted to be movably and vertically adjustable. The spray nozzle 21 may be mounted upon a threaded cylinder or a rack and pinion gear arrangement to provide for such adjustment. Furthermore, it is within the scope of the invention to move both the nozzle position and the eroding surface to control the distance therebetween and the resulting concentration.

The optimum distance between the nozzle 21 and the eroding surface 30 will depend upon the diameter of the solid chemical 13. The solid chemical 13 may be cast in various sizes and configurations, although in the preferred embodiment, the solid chemical 13 is a cylindrical mass having a diameter of approximately 3 inches (7.6 cm). Furthermore, a variety of nozzle configurations can be utilized, although the preferred embodiment uses a nozzle with a 90° spray angle. Assuming a nozzle 21 having a spray angle in the range of 60°–120°, and assuming that R is the radius of the solid product 13, the preferred nozzle-to-eroding surface distance is approximately $\frac{1}{2}$ R to 2 R. That is, for a three inch diameter solid chemical 13, the preferred distance would be approximately 0.75 inches to 3 inches. For a nozzle 21 having a different spray angle, the above range would be somewhat different depending upon the geometry of the situation. As used herein, the words "diameter", "radius" and the letter "R" are not meant to imply that the solid product 13 must be circular in cross-section. Rather, the chemical 13 could have a different cross-sectional shape, such as square, octagonal, etc.

Although the present invention is described in conjunction with a solid block concentrate 13 and a flat screen 19, it is to be understood that the invention could also be utilized with a powdered concentrate in conjunction with a relatively fine screen. The screen may be either horizontal or convex.

A variation of the present invention is the use of two separate detergent modules 10 on the scrubber 75, in conjunction with a diverter valve (not shown) which allows the operator to alternate between the two different types of solid products. If two dispensers 10 are utilized, one could be a solid detergent, and the other could be a solid floor wax. Alternatively, the two products could be a neutral floor cleaner for normal floor surfaces, and a heavy-duty floor cleaner for high-traffic areas or highly-soiled surfaces. Alternatively, the two solid products could be two noncompatible products which are mixed together in the floor scrubbing machine and dispensed in a single solution. There are certain products that cannot be mixed as liquids because they neutralize each other or cause an undesirable reaction, but which may be mixed at the point of usage. Certain defoamers and surfactants would be examples of the latter situation.

In operation, a container 20 containing a block of solid chemical 13 is loaded into the housing 11. The container cap (not shown) is removed, the container 20 is inverted and the exposed surface 30 of the solid wash chemical 13 is placed upon the support screen 19. The container 20 is inserted through the open end 70 of the housing 11.

The chamber 83 is filled with clean water 91 at the start of the cleaning operation. The water 91 follows a fluid flow path through conduits 92 and 22 from the water reservoir 83 to spray-forming nozzle 21 whenever the valve 38 is opened to allow flow into conduit 22. The valve 38 is controlled either electronically or manually. When provided with fluid flow therethrough, spray-forming nozzle 21 will direct a spray pattern at the bottom surface 30 of the solid chemical 13, wetting the lower portion of the chemical 13, which dissolves and passes in solution through the support screen 19 to the collector portion 16 of the housing 11. The concentrate detergent solution passes through the outlet port 17 of the housing 11 and is directed by conduit 25 to the scrubbing brush 85. Alternatively, the valve 38 can be opened to allow flow into conduit 37, thereby allowing clean water to bypass the detergent dispenser 20 and rinse the floor.

The concentration of the detergent solution is controlled either manually by the user or automatically by means of suitable sensing means, such as a conductivity sensor. In the preferred embodiment, the lowering of the solid chemical 13 with respect to the fixed nozzle 21 results in an increased concentration of the detergent solution. Alternatively, increasing the concentration of the detergent solution may be accomplished by raising the spray nozzle's 21 position vertically, and a decrease in concentration may be accomplished by lowering the spray nozzle's 21 position.

As the machine 75 is pushed, scrub brush 85 operates on the floor to scrub it, with pickup nozzles 35 thereafter vacuuming the dirty water 34 or detergent solution and transferring it to conduit 36 where it flows into the recovery tank 84. If desired, rinse water may be ejected onto the washed and vacuumed floor to apply rinse water thereto, which the rinse water then being drawn up by the pickup nozzles 35 and into conduit 36 to the chamber 84.

It is to be understood that numerous and various modifications can be readily devised in accordance with the principles of the present invention by those skilled in the art without departing from the spirit and scope of the invention. Therefore, it is not desired to restrict the invention to the particular constructions illustrated and described but to cover all modifications that may fall within the scope of the appended claims.

What is claimed is:

1. A floor scrubber comprising:

(a) brush means for scrubbing a floor;

(b) a water tank;

(c) a rinse conduit in fluid communication with said water tank for directing water proximate a brush means;

(d) a cleaning chemical dispenser positioned on a floor scrubber, said cleaning chemical dispenser including a screen for supporting a solid block detergent, said detergent being located within a housing, and including a spray nozzle capable of directing water toward an eroding surface of said solid detergent so as to produce a diluted chemical solution, said spray nozzle being in fluid communication with said water tank, said solution being formed as said floor scrubber cleans the floor;

(e) a cleaning solution conduit positioned within said floor scrubber and in fluid communication with said cleaning chemical dispenser for directing cleaning solution proximate said brush means; and (f) adjustment means for adjusting the concentration of said diluted cleaning solution dispensed, wherein said adjustment means comprises means for varying a distance between the solid detergent and said spray nozzle between a first, high concentration setting and a second low concentration setting.

2. The floor scrubber according to claim 1, wherein, said adjustment means raises or lowers the solid detergent with respect to a fixed spray nozzle.

3. The floor scrubber according to claim 2, wherein the solid detergent is cast within a cover of said dispenser.

4. The floor scrubber according to claim 1, further comprising a variable output pump for pumping water through said rinse conduit and said cleaning solution conduit.

5. The floor scrubber according to claim 4, wherein said variable output pump increases the dispensing rate according to a linear velocity of said floor scrubber.

6. The floor scrubber machine according to claim 1, wherein said housing means for the chemical comprises a top container within which is positioned the solid chemical, and a bottom container sized and configured to correspond with the shape and size of said top container, wherein said top container nests within said bottom container, and said top container descends into said bottom container as a volume of the solid chemical decreases.

7. A floor cleaning machine, comprising:

(a) housing means for a solid chemical having an eroding surface, said housing means being mounted upon a floor cleaning machine;

(b) a spray nozzle mounted upon said floor cleaning machine for directing a solvent upon said eroding surface so as to produce a detergent solution;

(c) a solvent inlet conduit in fluid communication with said spray nozzle;

(d) a solution outlet conduit extending from said housing means to a floor being cleaned; and (e) adjustment means for adjusting a position of said spray nozzle with respect to a fixed eroding surface so as to vary a distance between said spray nozzle and said eroding surface and thereby vary a concentration of the detergent solution.

8. The floor cleaning machine according to claim 7, further comprising a variable output pump for directing the solvent through said solvent inlet conduit and spray nozzle.

9. The floor cleaning machine according to claim 8, further comprising a valve through which the solvent flows, said valve directing the solvent either through the solvent inlet conduit or directing the solvent to a floor surface.

10. The floor cleaning machine according to claim 9, wherein the solvent is water.

11. The floor cleaning machine according to claim 10, further comprising dispensing rate adjustment means, wherein a rate of detergent solution dispensed varies according to a linear velocity of said floor cleaning machine.

12. A floor cleaning machine according to claim 7, wherein said spray nozzle is mounted upon a threaded support means.

13. The floor cleaning machine according to claim 7, wherein said spray nozzle is mounted upon rack and pinion gear support means.

14. A method for cleaning a floor with a portable floor cleaning machine having a scrubbing brush, the method comprising the steps of:

(a) providing a solid detergent dispenser, which is mounted upon a floor cleaning machine, said dispenser including a screen;

(b) inserting a solid detergent block within said solid detergent dispenser and onto said screen;

(c) spraying water from a water tank in said floor cleaning machine upon an eroding face of the solid detergent block, thereby dissolving a portion of said solid block so as to form a detergent solution, said detergent solution being formed while said floor cleaning machine is in operation;

(d) adjusting the concentration of the detergent solution; and (e) dispensing said detergent solution proximate a scrubbing brush.

15. The method according to claim 14, wherein varying a distance between a spray nozzle and the eroding face adjusts the concentration.

16. The method according to claim 15, wherein a position of said eroding face is varied with respect a fixed nozzle.

17. The method according to claim 14, further comprising the step of ejecting rinse water from said floor cleaning machine.

18. A floor cleaning machine, comprising:

(a) housing means for a solid chemical having an eroding surface, said housing means being mounted upon a floor cleaning machine;

(b) a spray nozzle mounted upon said floor cleaning machine for directing a solvent upon said eroding surface so as to produce a detergent solution;

(c) a solvent inlet conduit in fluid communication with said spray nozzle;

(d) a solution outlet conduit extending from said housing means to a floor being cleaned; and (e) adjustment means for adjusting a position of said eroding surface with respect to a fixed spray nozzle so as to vary a distance between said spray nozzle and said eroding surface and thereby vary a concentration of the detergent solution.

19. The floor cleaning machine according to claim 18, further comprising a variable output pump for pumping water through said rinse conduit and said cleaning solution conduit.

20. The floor cleaning machine according to claim 19, wherein said variable output pump increases the dispensing rate according to a linear velocity of said floor cleaning machine.

21. The floor cleaning machine according to claim 18, further comprising a valve through which the solvent flows, said valve directing the solvent either through the solvent inlet conduit or directing the solvent to a floor surface.

22. The floor cleaning machine according to claim 21, wherein the solvent is water.

23. The floor cleaning machine according to claim 18, wherein said adjustment means comprises an upper and lower cam member, said upper cam member supporting the chemical, wherein rotation of said upper cam member results in vertical adjustment of the eroding surface of the chemical.

24. The floor cleaning machine according to claim 18, wherein said housing means for the chemical comprises a top container within which is positioned the solid chemical, and a bottom container sized and configured to correspond with the shape and size of said top container, wherein said top container nests within said bottom container, and said top container descends into said bottom container as a volume of the solid chemical decreases.

* * * * *

UNITED STATES PATENT AND TRADEMARK OFFICE
CERTIFICATE OF CORRECTION

PATENT NO. : 5,411,716

DATED : May 2, 1995

INVENTOR(S) : John E. Thomas et al.

It is certified that error appears in the above-identified patent and that said Letters Patent is hereby corrected as shown below:

On column 6, line 25, please delete "69" after the word "walls"

On column 11, line 41 (claim 16), please insert --to-- after the word "respect"

Signed and Sealed this

Fifth Day of September, 1995

Attest:

BRUCE LEHMAN

*Attesting Officer*

*Commissioner of Patents and Trademarks*